(12) United States Patent
Youm

(10) Patent No.: US 9,385,369 B2
(45) Date of Patent: Jul. 5, 2016

(54) RECHARGEABLE LITHIUM BATTERY

(71) Applicant: SAMSUNG SDI CO., LTD., Yongin-si, Gyeonggi-do (KR)

(72) Inventor: Chul Youm, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 23 days.

(21) Appl. No.: 14/571,109

(22) Filed: Dec. 15, 2014

(65) Prior Publication Data

US 2015/0194698 A1    Jul. 9, 2015

(30) Foreign Application Priority Data

Jan. 9, 2014  (KR) .................. 10-2014-0003041

(51) Int. Cl.

| | | |
|---|---|---|
| H01M 10/36 | (2010.01) | |
| H01M 4/36 | (2006.01) | |
| H01M 10/052 | (2010.01) | |
| H01M 4/38 | (2006.01) | |
| H01M 4/587 | (2010.01) | |
| H01M 10/0567 | (2010.01) | |
| H01M 4/133 | (2010.01) | |
| H01M 4/134 | (2010.01) | |
| H01M 4/02 | (2006.01) | |

(52) U.S. Cl.
CPC .............. *H01M 4/366* (2013.01); *H01M 4/133* (2013.01); *H01M 4/134* (2013.01); *H01M 4/386* (2013.01); *H01M 4/587* (2013.01); *H01M 10/052* (2013.01); *H01M 10/0567* (2013.01); *H01M 2004/021* (2013.01); *H01M 2004/027* (2013.01); *H01M 2300/0025* (2013.01); *Y02E 60/122* (2013.01); *Y02T 10/7011* (2013.01)

(58) Field of Classification Search
CPC ..... H01M 4/366; H01M 4/386; H01M 4/587; H01M 4/133; H01M 4/134; H01M 10/0567; H01M 10/052; H01M 2004/027; Y02E 60/122
See application file for complete search history.

(56) References Cited

U.S. PATENT DOCUMENTS

| | | | |
|---|---|---|---|
| 6,733,922 B2 | 5/2004 | Matsubara et al. | |
| 2012/0115044 A1 | 5/2012 | Yamaguchi et al. | |

FOREIGN PATENT DOCUMENTS

| | | |
|---|---|---|
| KR | 10-0589309 | 6/2006 |
| KR | 10-0684729 | 2/2007 |
| KR | 10-2009-0063174 | 6/2009 |
| KR | 10-2009-0086456 | 8/2009 |

OTHER PUBLICATIONS

Korean Patent Abstracts Publication No. 10-2002-0070764, dated Sep. 11, 2002, for KR 10-0589309, 1 page.
Korean Patent Abstracts Publication No. 10-2006-0048753, dated May 18, 2006, for KR 10-0684729, 1 page.

*Primary Examiner* — Laura Weiner
(74) *Attorney, Agent, or Firm* — Lewis Roca Rothgerber Christie LLP

(57) ABSTRACT

A rechargeable lithium battery includes a negative electrode including a negative active material, a positive electrode including a positive active material, and an electrolyte including a lithium salt, a non-aqueous organic solvent, and an additive. The negative active material includes a graphite-silicon composite and graphite. The graphite-silicon composite includes a graphite particle, a silicon (Si) particle on the surface of the graphite particle, and a carbon coating layer surrounding the silicon particle on the surface of the graphite particle. The additive includes fluoroethylene carbonate in an amount of about 2 to about 5 wt % based on the total amount of the non-aqueous organic solvent.

12 Claims, 8 Drawing Sheets

RECHARGEABLE LITHIUM BATTERY

CROSS-REFERENCE TO RELATED APPLICATION

This application claims priority to and the benefit of Korean Patent Application No. 10-2014-0003041 filed in the Korean Intellectual Property Office on Jan. 9, 2014, the entire content of which is incorporated herein by reference.

BACKGROUND

1. Field

Aspects of this disclosure relate to a rechargeable lithium battery.

2. Description of the Related Art

The rechargeable lithium battery has recently drawn attention as a power source for small, portable electronic devices. The rechargeable lithium battery usually includes an organic electrolyte solution, and thus has a high discharge voltage that is two times or more greater than that of a conventional battery including an alkali aqueous solution. Accordingly, the rechargeable lithium battery has a high energy density.

The rechargeable lithium battery is usually manufactured by injecting an electrolyte into an electrode assembly, which includes a positive electrode including a positive active material capable of intercalating/deintercalating lithium ions and a negative electrode including a negative active material capable of intercalating/deintercalating lithium ions.

Various carbon-based materials such as artificial graphite, natural graphite, and hard carbon have been utilized as the negative active material. However, according to recent research, silicon (Si) may be used as a non-carbon-based negative active material capable of meeting the industry's needs for stability and high capacity.

SUMMARY

Aspects of embodiments of the present invention are directed to a high capacity and high power rechargeable lithium battery.

According to one embodiment of the present invention a rechargeable lithium battery includes a negative electrode including a negative active material, a positive electrode including a positive active material, and an electrolyte including a lithium salt, a non-aqueous organic solvent, and an additive, The negative active material includes a graphite-silicon composite and graphite. The graphite-silicon composite includes a graphite particle, a silicon (Si) particle on a surface of the graphite particle, and a carbon coating layer surrounding the silicon (Si) particle on the surface of the graphite particle.

The additive includes fluoroethylene carbonate in an amount of about 2 wt % to about 5 wt % based on the total amount of the non-aqueous organic solvent.

The graphite-silicon composite may be present in an amount of about 5 wt % to about 15 wt % based on the total amount of the negative active material.

The silicon (Si) particle may be present in an amount of about 1.0 wt % to about 7.5 wt % based on the total amount of the negative active material.

The silicon (Si) particle may be present in an amount of about 15 wt % to about 25 wt % based on the total amount of the graphite-silicon composite.

The graphite particle may be present in an amount of about 55 wt % to about 65 wt % based on the total amount of the graphite-silicon composite.

The carbon coating layer may be present in an amount of about 15 wt % to about 25 wt % based on the total amount of the graphite-silicon composite.

The silicon (Si) particle may have an average particle diameter of about 50 nm to about 300 nm.

The carbon coating layer may have a thickness of about 0.5 µm to about 1.0 µm.

The non-aqueous organic solvent may include dimethyl carbonate (DMC).

The dimethyl carbonate (DMC) may be present in an amount of about 50 volume % to about 70 volume % based on the total amount of the non-aqueous organic solvent.

The non-aqueous organic solvent may have a viscosity of about 0.3 cP to about 5.0 cP.

The rechargeable lithium battery may be operated at a rate of about 5 C to about 10 C.

Other embodiments of the present invention are included in the following detailed description.

A high capacity and high power rechargeable lithium battery may be realized.

DETAILED DESCRIPTION

Hereinafter, embodiments of the present invention are described. However, these embodiments are exemplary, and this disclosure is not limited thereto. As those skilled in the art would realize, the described embodiments may be modified in various different ways, all without departing from the spirit or scope of the present invention. Expressions such as "at least one of" and "one of," when preceding a list of elements, modify the entire list of elements and do not modify the individual elements of the list. Further, the use of "may" when describing embodiments of the present invention refers to "one or more embodiments of the present invention."

A rechargeable lithium battery according to one embodiment includes a negative electrode including a negative active material, a positive electrode including a positive active material, and an electrolyte including a lithium salt, a non-aqueous organic solvent, and an additive. The negative active material includes a graphite-silicon composite and graphite. The graphite-silicon composite includes a graphite particle, a silicon (Si) particle on the surface of the graphite particle and a carbon coating layer surrounding the graphite particle and the silicon (Si) particle. The additive includes fluoroethylene carbonate in an amount of about 2 wt % to about 5 wt % based on the total amount of the non-aqueous organic solvent.

Figure 2:
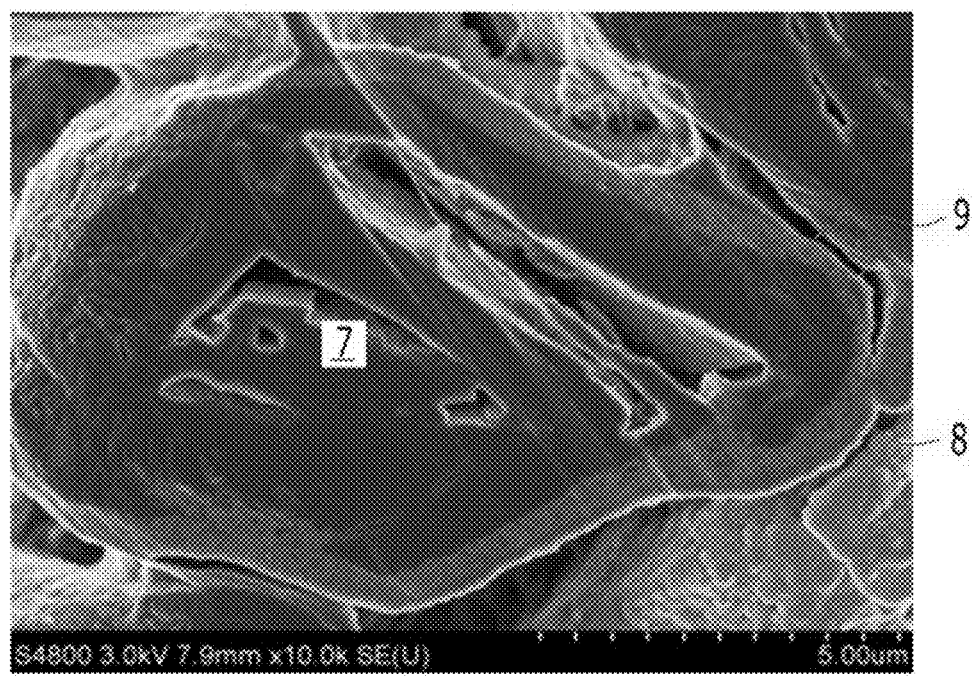
FIG. 2 is a scanning electron microscope (SEM) photograph of a graphite-silicon composite included in a negative active material according to one embodiment of the present invention.

FIG. 2 is a SEM photograph of the graphite-silicon composite included in the negative active material according to one embodiment of the present invention.

Referring to FIG. 2, the graphite-silicon composite included in the negative active material may include a graphite particle 7, a silicon (Si) particle 8 on the surface of the graphite particle 7, and a carbon coating layer 9 surrounding the silicon (Si) particle 8 on the surface of the graphite particle 7.

When the negative active material includes the graphite-silicon composite including the silicon (Si) particle, the negative active material may have good electrical conductivity.

The negative active material according to one embodiment of the present invention may include graphite, in addition to the above-described graphite-silicon composite.

The graphite-silicon composite and the graphite included in the negative active material make surface contact, and therefore have lower contact resistance as compared to a negative active material in which a $SiO_x$ particle and a graphite particle are simply mixed (which simple mixture creates point contact rather than surface contact).

The graphite-silicon composite may be included in an amount of about 5 wt % to about 15 wt %, and in some embodiments about 7 wt % to about 12 wt %, based on the total amount of the negative active material. The graphite may be included in an amount of about 95 wt % to about 85 wt % and specifically about 93 wt % to about 88 wt %, based on the total amount of the negative active material.

When the graphite-silicon composite is included within these ranges, it may suppress (or reduce) volume expansion of the silicon (Si) particle and may facilitate good electrical conductivity, thus improving cycle-life characteristics of the battery.

The silicon (Si) particle may be included in an amount of about 1.0 wt % to about 7.5 wt %, and in some embodiments about 1.2 wt % to about 5.0 wt %, based on the total amount of the negative active material. When the silicon (Si) particle is included within these ranges, good electrical conductivity may be realized.

The silicon (Si) particle may be included in an amount of about 15 wt % to about 25 wt %, and in some embodiments about 17 wt % to about 23 wt %, based on the total amount of the graphite-silicon composite. When the silicon (Si) particle is included within these ranges, volume expansion of the silicon (Si) particle that occurs during the charge and discharge of the battery may be suppressed (or reduced), and cycle-life characteristics may be improved.

The graphite particle may be included in an amount of about 55 wt % to about 65 wt %, and in some embodiments about 57 wt % to about 62 wt %, based on the total amount of the graphite-silicon composite.

The carbon coating layer may be included in an amount of about 15 wt % to about 25 wt %, and in some embodiments about 17 wt % to about 20 wt %, based on the total amount of the graphite-silicon composite.

When the graphite particle and the carbon coating layer are included within these ranges, the graphite-silicon composite may suppress (or reduce) volume expansion of the silicon (Si) particle and facilitate good electrical conductivity, thus improving cycle-life characteristics.

The silicon (Si) particle may have an average particle diameter of about 50 nm to about 300 nm, and in some embodiments about 80 nm to about 200 nm. When the silicon (Si) particle has average particle diameter within these ranges, the graphite-silicon composite may facilitate smooth intercalation and deintercalation of lithium ions due to low ion resistance and thus, may suppress (or reduce) volume expansion of the silicon (Si) particle and improve cycle-life characteristics.

The carbon coating layer may have a thickness of about 0.5 µm to about 1.0 µm, and in some embodiments about 0.6 µm to about 0.9 µm. When the carbon coating layer has a thickness within these ranges, the carbon coating layer is capable of surrounding both the silicon (Si) particle and the graphite particle, such that the silicon (Si) particle may be firmly attached to the surface of the graphite particle. Accordingly, when the volume of the silicon (Si) particle expands during the charge and discharge of the battery, the carbon coating layer along with the graphite particle may suppress (or reduce) the volume expansion of the silicon (Si) particle, thus further improving cycle-life characteristics.

A negative electrode according to one embodiment of the present invention will be described referring to FIG. 3.

Figure 3:
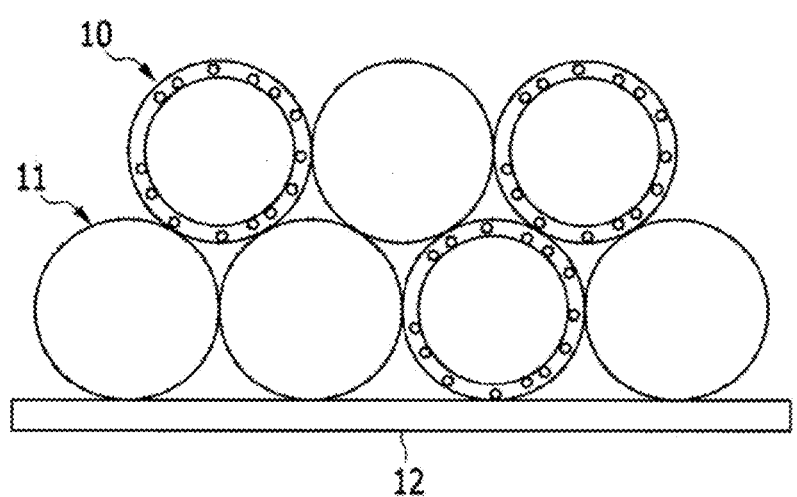
FIG. 3 is a schematic view of a negative electrode according to one embodiment of the present invention.
Figure 4:
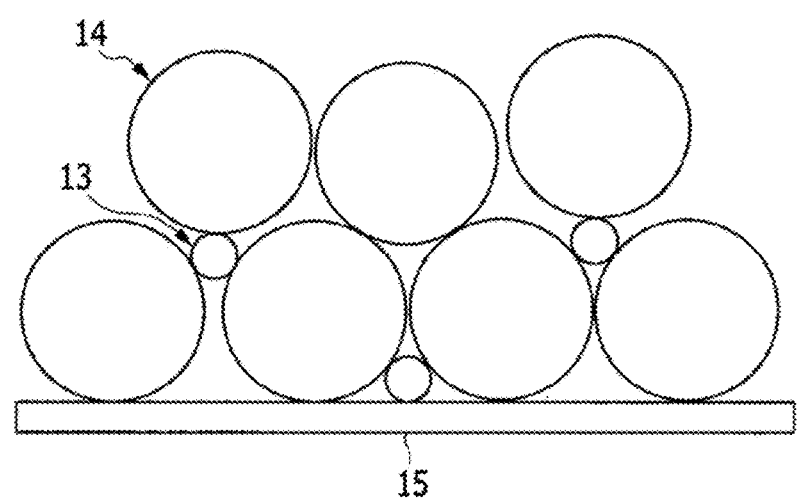
FIG. 4 is a schematic view of a negative electrode according to Comparative Example 1.

FIG. 3 is a schematic view of a negative electrode according to one embodiment of the present invention. While FIG. 3 shows one example of the negative electrode, the negative electrode is not limited thereto.

Referring to FIG. 3, the negative electrode includes a current collector 12 and a negative active material on the current collector 12. The negative active material includes a graphite-silicon composite 10 and graphite 11.

The current collector 12 may be selected from a copper foil, a nickel foil, a stainless steel foil, a titanium foil, a nickel foam, a copper foam, a polymer substrate coated with a conductive metal and/or a combination thereof.

The negative active material may be the same as described above.

The negative active material may further include a binder and, optionally, a conductive material.

The binder may be included in an amount of about 1 wt % to about 5 wt % based on the total amount of the negative active material. In embodiments where the conductive material is further included, the negative active material may include about 90 wt % to about 98 wt % of the negative active material described above, about 1 wt % to about 5 wt % of the binder, and about 1 wt % to about 5 wt % of the conductive material.

In one embodiment, the binder improves the binding properties of the negative active material particles with one another and with the current collector. The binder may be a non-water-soluble binder, a water-soluble binder, or a combination thereof, but the binder is not limited thereto.

The non-water-soluble binder may be selected from polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, and/or a combination thereof, but the non-water-soluble binder is not limited thereto.

The water-soluble binder may be selected from a styrene-butadiene rubber, an acrylated styrene-butadiene rubber, polyvinyl alcohol, sodium polyacrylate, a copolymer of propylene and C2 to C8 olefin, a copolymer of (meth)acrylic acid and (meth)acrylic acid alkylester, and/or a combination thereof, but the water-soluble binder is not limited thereto.

When the water-soluble binder is used as the negative electrode binder, a cellulose-based compound may be further included to provide viscosity. The cellulose-based compound may include one or more of carboxymethyl cellulose, hydroxypropylmethyl cellulose, methyl cellulose, or alkali metal salts thereof, but the cellulose-based compound is not limited thereto. The alkali metal may be Na, K, or Li, but the alkali metal is not limited thereto. The cellulose-based compound may be included in an amount of about 0.1 parts by weight to about 50 parts by weight based on 100 parts by weight of the binder.

In one embodiment, the conductive material improves the conductivity of the electrode. Any suitable electrically conductive material may be used as the conductive material, unless it causes a chemical change in the battery. Non-limiting examples of the conductive material include a carbon-based material such as natural graphite, artificial graphite, carbon black, acetylene black, ketjen black, a carbon fiber, and the like; a metal-based material of a metal powder or a metal fiber and the like including copper, nickel, aluminum, silver, and the like; a conductive polymer such as a polyphenylene derivative and the like; and/or a combination thereof.

The rechargeable lithium battery according to embodiments of the present invention may be operated at a rate of about 5 C to about 10 C. Accordingly, the rechargeable lithium battery may be utilized in high power electric tools, e-bikes (e.g. an electric assisted bicycle), electric vehicles (e.g. a hybrid electric vehicle), and the like.

Figure 1:
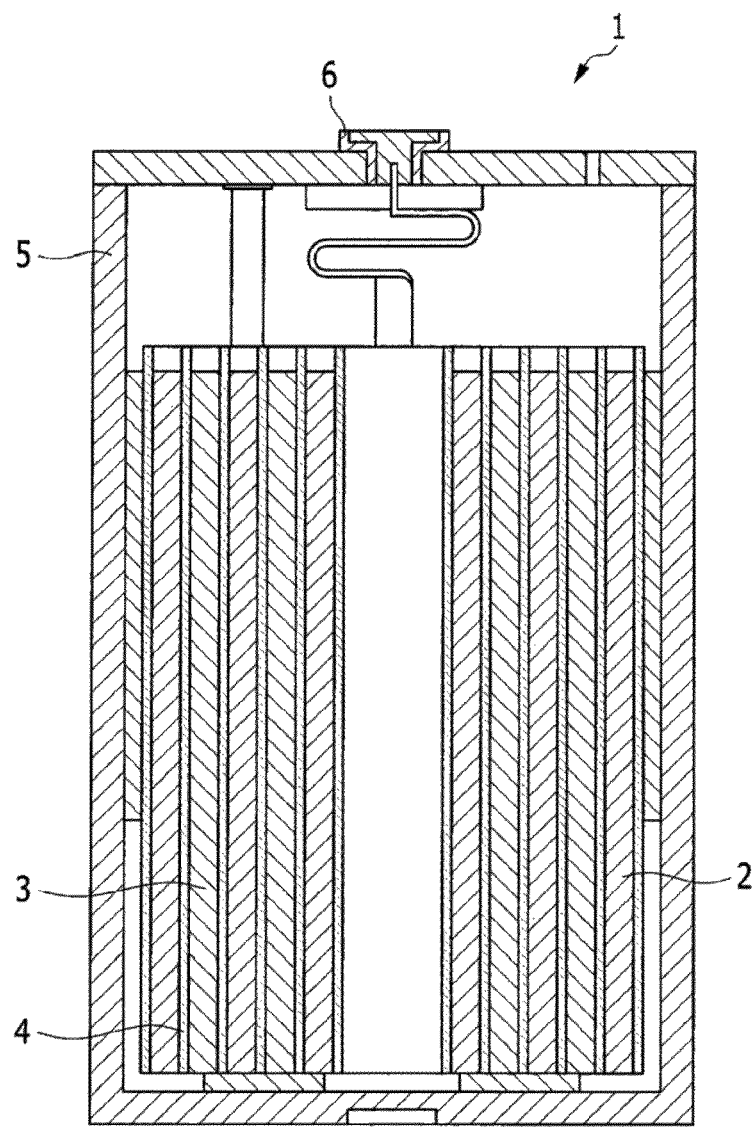
FIG. 1 is a cross-sectional schematic view of a rechargeable lithium battery according to one embodiment of the present invention.

FIG. 1 is a cross-sectional schematic view of a rechargeable lithium battery according to one embodiment.

The rechargeable lithium battery 1 according to FIG. 1 is a prismatic battery that includes an electrode assembly including a positive electrode 2, a negative electrode 3, and a separator 4 between the positive electrode 2 and the negative electrode 3. The electrode assembly is inserted in a battery case 5, an electrolyte is injected though the upper part of the battery case 5, and a cap plate 6 seals the battery case 5. The rechargeable lithium battery according to embodiments of the present invention is not limited to a prismatic shape, and may be any suitable shape (e.g. cylindrical, coin-type, or pouch shape) as long as the battery includes the negative active material according to embodiments of the present invention and is capable of being operated.

In one embodiment, the negative electrode 3 is the same as the negative electrode described above.

In one embodiment, the positive electrode 2 includes a current collector and a positive active material on the current collector.

The current collector may be Al (aluminum) foil, but the current collector is not limited thereto.

The positive active material may include lithiated intercalation compounds capable of reversibly intercalating and deintercalating lithium ions. In some embodiments, the positive active material may be a lithium composite oxide including a metal selected from cobalt, manganese, nickel, and/or combinations thereof, but the positive active material is not limited thereto. For example, the positive active material may include a compound or combinations of compounds represented by the following chemical formulae: $Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0.90 \le a \le 1.8$, $0 \le b \le 0.5$, $0 \le c \le 0.05$); $Li_aE_{2-b}X_bO_{4-c}D_c$ ($0.90 \le a \le 1.8$, $0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.05$, $0 < \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Co_bX_cO_{2-\alpha}T_2$ ($0.90 \le a \le 1.8$, $0 \le b \le 0.5$, $0 \le c \le 0.05$, $0 < \alpha < 2$); $Li_aNi_{1-b-c}Mn_bX_cD_\alpha$ ($0.90 \le a \le 1.8$, $0 \le b \le 0.5$, $0 \le c \le 0.05$, $0 < \alpha \le 2$); $Li_aN_{1-b-c}Mn_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Mn_bX_cO_{2-\alpha}T_2$ ($0.90 \le a \le 1.8$, $0 \le b \le 0.5$, $0 \le c \le 0.05$, $0 < \alpha < 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$ In the above chemical formulae, A is selected from Ni, Co, Mn, and/or combinations thereof; X is selected from Al, Ni, Co, Mn, Cr, Fe, Mg, Sr, V, rare earth elements, and/or combinations thereof; D is selected from O, F, S, P, and/or combinations thereof; E is selected from Co, Mn, and/or combinations thereof; T is selected from F, S, P, and/or combinations thereof; G is selected from Al, Cr, Mn, Fe, Mg, La, Ce, Sr, V, and/or combinations thereof; Q is selected from Ti, Mo, Mn, and/or combinations thereof; Z is selected from Cr, V, Fe, Sc, Y, and/or combinations thereof; and J is selected from V, Cr, Mn, Co, Ni, Cu, and/or combinations thereof.

In one embodiment, the above-described compounds may have a coating layer on their respective surfaces or may be mixed with compounds having a coating layer. The coating layer may include at least one coating element compound selected from an oxide of a coating element, a hydroxide of a coating element, an oxyhydroxide of a coating element, an oxycarbonate of a coating element, and a hydroxyl carbonate of a coating element. The coating element compound for a coating layer may be amorphous or crystalline. The coating element for a coating layer may include Mg, Al, Co, K, Na, Ca, Si, Ti, V, Sn, Ge, Ga, B, As, Zr, and/or a combination thereof, but the coating element is not limited thereto. The coating layer may be formed by any suitable method which does not have any negative influence on the properties of the positive active material. For example, the method for forming the coating layer may include any coating method such as spraying, dipping, and the like, but the method for forming the coating layer is not limited thereto. Methods for forming the coating layer should be apparent to one of ordinary skill in the art and thus will not be described here.

The positive active material may further include a binder, and, optionally, a conductive material. When the conductive material is further included, the positive active material may include about 80 wt % to about 99 wt % of the positive active material described above, about 1 wt % to about 5 wt % of the binder, and about 1 wt % to about 5 wt % of the conductive material.

In one embodiment, the binder improves the binding properties of the positive active material particles with one another and with the current collector. Non-limiting examples of the binder include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

In one embodiment, the conductive material improves the conductivity of the electrode. Any suitable electrically conductive material may be used as the conductive material, unless it causes a chemical change in the battery. Non-limiting examples of the conductive material include carbon-based materials such as natural graphite, artificial graphite, carbon black, acetylene black, ketjen black, a carbon fiber, and the like; a metal-based material such as a metal powder or a metal fiber and the like of copper, nickel, aluminum, silver, and the like; a conductive polymer such as a polyphenylene derivative, and the like; and/or a combination thereof.

The electrolyte solution may include a lithium salt, a non-aqueous organic solvent, and the additive as described above.

The additive may include fluoroethylene carbonate in an amount of about 2 wt % to about 5 wt %, and in some embodiments about 2.5 wt % to about 4 wt %, based on the total amount of the non-aqueous organic solvent. When fluoroethylene carbonate is included within these ranges, storage characteristics at high temperature may be improved and the cost of the battery may be reduced.

Accordingly, the rechargeable lithium battery of embodiments of the present invention may function as a high capacity and high power battery.

Other non-limiting examples of the additive may include vinylene carbonate, metal fluoride, glutaronitrile, succinonitrile, adiponitrile, 3,3'-thiodipropionitrile, 1,3-propane sultone, 1,3-propene sultone, lithium bis(oxalato)borate, lithium tetrafluorobarate, vinylethylene carbonate, difluoroethylenecarbonate, fluorodimethylcarbonate, fluoroethylmethylcarbonate, and/or combinations thereof.

The non-aqueous organic solvent may include dimethyl carbonate (DMC), but the non-aqueous organic solvent is not limited thereto.

The dimethyl carbonate (DMC) may be included in an amount of about 50 volume % to about 70 volume % based on the total amount of the non-aqueous organic solvent.

When dimethyl carbonate (DMC) is included in the non-aqueous organic solvent, the non-aqueous organic solvent may have low viscosity characteristics and may realize an electrolyte solution having low viscosity characteristics. The non-aqueous organic solvent may have a viscosity of about 0.3 cP to about 5.0 cP, and in some embodiments about 0.3 cP to about 3.0 cP, or about 0.3 to about 1.8 cP.

Low viscosity characteristics may realize an electrolyte solution suitable for a high power battery.

Non-limiting examples of the lithium salt include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where, x and y are natural numbers, e.g., an integer of 1 to 20), LiCl, LiI, $LiB(C_2O_4)_2$ (lithium bis(oxalato)borate; LiBOB), and/or combinations thereof.

The lithium salt dissolved in the non-aqueous solvent supplies lithium ions in the rechargeable lithium battery, enables the basic operation of the rechargeable lithium battery, and improves lithium ion transfer between the positive and negative electrodes.

The lithium salt may be included in a concentration of about 0.1 M to about 2.0 M. When the lithium salt is included within the above concentration range, electrolyte performance and lithium ion mobility may be enhanced due to suitable (or optimal) electrolyte conductivity and viscosity.

In one embodiment, the non-aqueous organic solvent serves as a medium for transmitting ions taking part in the electrochemical reaction of the battery. The non-aqueous organic solvent may include a carbonate-based, ester-based, ether-based, ketone-based, alcohol-based, or aprotic solvent, but the non-aqueous organic solvent is not limited thereto.

The carbonate-based solvent may be, for example, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like, but the carbonate-based solvent is not limited thereto.

In embodiments where the non-aqueous organic solvent includes a mixture of linear carbonate compounds and cyclic carbonate compounds, the non-aqueous organic solvent may have a high dielectric constant and low viscosity. The cyclic carbonate and the linear carbonate may be mixed together in a volume ratio of about 1:1 to about 1:9.

The separator 4 may include any suitable material capable of separating the negative electrode from the positive electrode and providing a transporting passage of lithium ions. Accordingly, the separator may have a low resistance to ion transport and may facilitate good impregnation of the electrolyte. For example, the separator may be selected from glass fiber, polyester, TEFLON (tetrafluoroethylene), polyethylene, polypropylene, polytetrafluoroethylene (PTFE), and/or combinations thereof, but the separator is not limited thereto. For example, a polyolefin-based polymer separator such as a polyethylene separator, a polypropylene separator or the like may be used for the lithium ion battery. In one embodiment, the separator may have a form of a non-woven fabric or a woven fabric. In order to provide heat resistance and/or mechanical strength, a coated separator that includes a ceramic component or a polymer material may be used. In one embodiment, the separator may have a mono-layered or a multi-layered structure.

The negative and positive electrodes may be manufactured by mixing the active material, the conductive material, and the binder in a solvent to prepare an active material composition, followed by coating the active material composition on the current collector. The electrode manufacturing method should be apparent to one of ordinary skill in the art, and thus will not be described in the present specification. In one embodiment, the solvent includes N-methylpyrrolidone and the like, but the solvent is not limited thereto. In embodiments where the water-soluble binder is used in the negative electrode, water may be used as a solvent during the preparation of the negative active material composition.

The following examples are presented for illustrative purposes only, and do not limit the scope of the present invention.

Manufacture of Rechargeable Lithium Battery Cell

Example 1

20 wt % of a Si particle having an average particle diameter of 100 nm (available from Shenzhen BTR Energy Materials Co. Ltd.) and 60 wt % of natural graphite (available from Shenzhen BTR Energy Materials Co. Ltd.) were mixed in an ethanol solvent and dried to obtain a graphite-silicon precursor having the Si particle on the surface of natural graphite. 20 wt % of coal-based pitch was added to the graphite-silicon precursor, and the resulting mixture was heat-treated at 850° C. under an $N_2$ atmosphere for 2 hours to obtain a graphite-silicon composite. The resulting graphite-silicon composite was mixed with graphite at a weight ratio of 11:89 wt %, thereby preparing a negative active material. In the resulting negative active material, the graphite-silicon composite including the Si particle on the surface of the natural graphite, and the graphite were both surrounded with a carbon coating layer. The thickness of the carbon coating layer was 0.8 μm.

98 wt % of the resulting negative active material, 1 wt % of carboxymethyl cellulose, and 1 wt % of a styrene butadiene rubber were mixed in distilled water to prepare a slurry. The slurry was coated on a Cu foil current collector, dried and compressed, thereby manufacturing a negative electrode.

A positive electrode was manufactured by mixing 96 wt % of a $LiCoO_2$ positive active material, 2 wt % of a polyvinylidene fluoride binder, and 2 wt % of a carbon black conductive material in N-methylpyrrolidone to prepare a positive active material slurry. The positive active material slurry was coated on an Al foil current collector and then dried and compressed.

The resulting negative and positive electrodes were combined with an electrolyte solution, thereby manufacturing a prismatic battery cell. The electrolyte solution was prepared by dissolving 1.15 M of $LiPF_6$ and 3 wt % of fluoroethylene carbonate (FEC) based on 100 wt % of the non-aqueous organic solvent, in the non-aqueous organic solvent including ethylene carbonate (EC), ethylmethyl carbonate (EMC), and dimethylcarbonate (DMC) in a 2:2:6 volume ratio. The viscosity of the non-aqueous organic solvent was 1.5 cP.

Comparative Example 1

A negative active material and a rechargeable lithium battery cell were manufactured as in Example 1 except for using a $SiO_x$ particle having an average particle diameter of 1 μm and graphite instead of the mixture of the graphite-silicon composite and graphite in Example 1.

Comparative Example 2

A negative active material and a rechargeable lithium battery cell were manufactured as in Example 1 except for using a graphite particle having an average particle diameter of 15 μm instead of the mixture of the graphite-silicon composite and graphite in Example 1.

Evaluation 1: Electrical Conductivity Comparison wt % of the negative active material used in Example 1 and, separately, Comparative Example 1, 1 wt % of carboxymethyl cellulose and 1 wt % of a styrene butadiene rubber were mixed in distilled water to prepare slurries. The slurries were coated on a polyethylene (PE) film, dried and compressed, thereby manufacturing negative electrodes. The resistances of the negative electrodes were measured by using a four-probe resistance measuring instrument.

Figure 5:
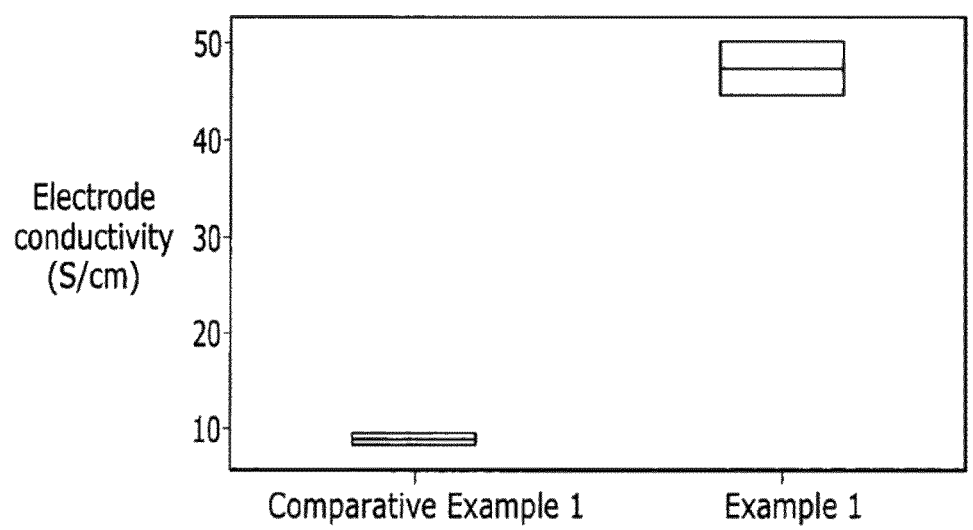
FIG. 5 is a graph comparing electrical conductivity of the negative electrodes according to Example 1 and Comparative Example 1.

FIG. 5 is a graph comparing the electrical conductivity of the negative electrodes according to Example 1 and Comparative Example 1.

Referring to FIG. 5, the electrical conductivity of the negative electrode according to Example 1 was five times better than the electrical conductivity of the negative electrode according to Comparative Example 1.

Evaluation 2: Output Characteristic Comparison

For each of the rechargeable lithium batteries of Example 1 and Comparative Example 1, lithium metal was used as a counter electrode to manufacture a coin half-cell.

Each coin half-cell was charged with a constant current (0.2 C) and a constant voltage (1 mV) up to a state of charge of 100%, and then discharged by changing the discharge current from 0.2 C to 5 C. The capacity of each of the coin half-cells was measured and converted into a capacity ratio relative to 0.2 C, for the purpose of evaluating the output characteristics.

Figure 6:
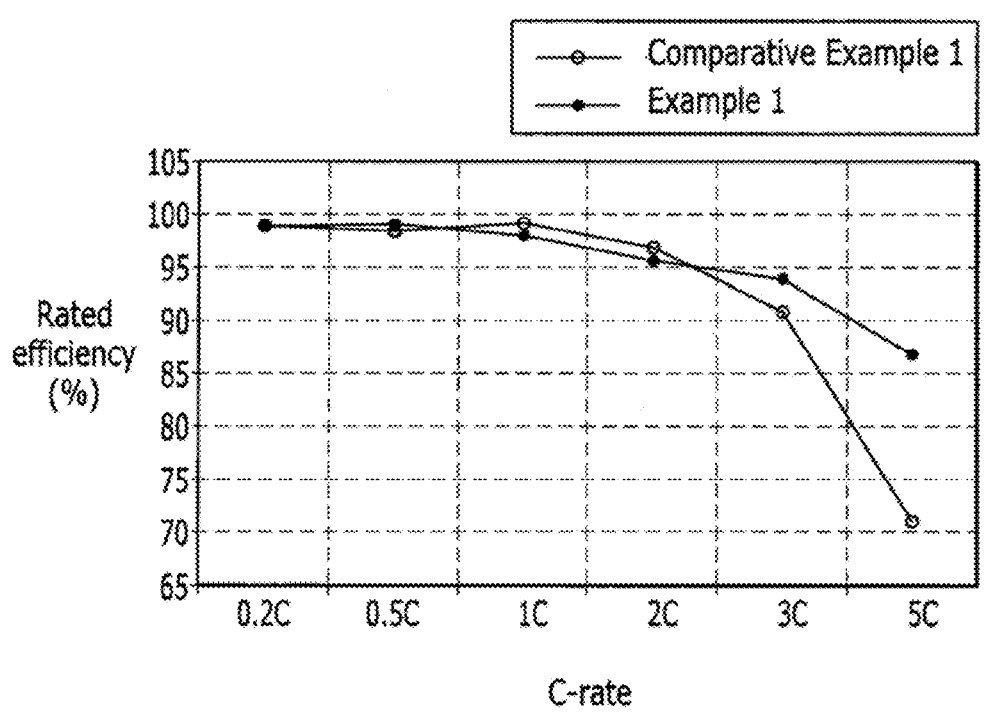
FIG. 6 is a graph comparing output characteristics of the rechargeable lithium batteries according to Example 1 and Comparative Example 1.

FIG. 6 is a graph comparing the output characteristics of the rechargeable lithium battery cells according to Example 1 and Comparative Example 1.

Referring to FIG. 6, the cell according to Example 1 showed better high rate output characteristics than the cell according to Comparative Example 1.

Evaluation 3: High Current Cycle-Life Characteristics of High Power Battery

Each of the battery cells according to Example 1 and Comparative Examples 1 and 2 were repetitively charged at 4 A/4.2V and discharged at 20 A/2.5V, and their respective cycle-life characteristics were evaluated at high current.

Figure 7:
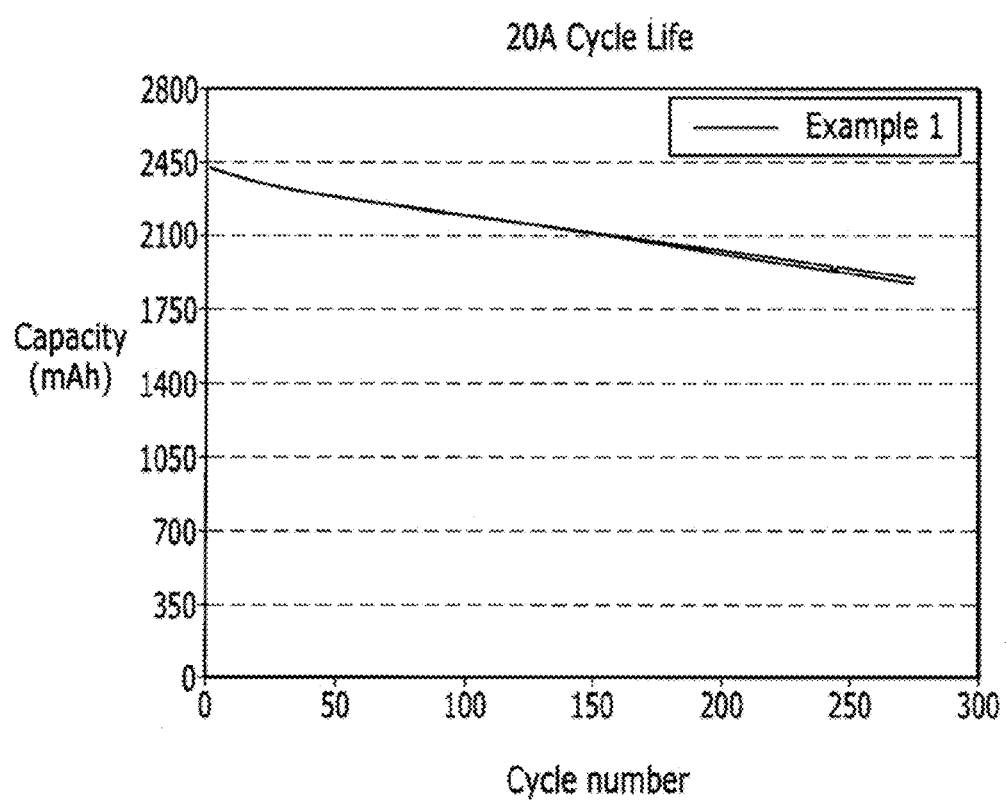
FIG. 7 is a graph showing cycle-life characteristics of the rechargeable lithium battery according to Example 1.

FIG. 7 is a graph showing the cycle-life characteristics of the cell according to Example 1.

Figure 8:
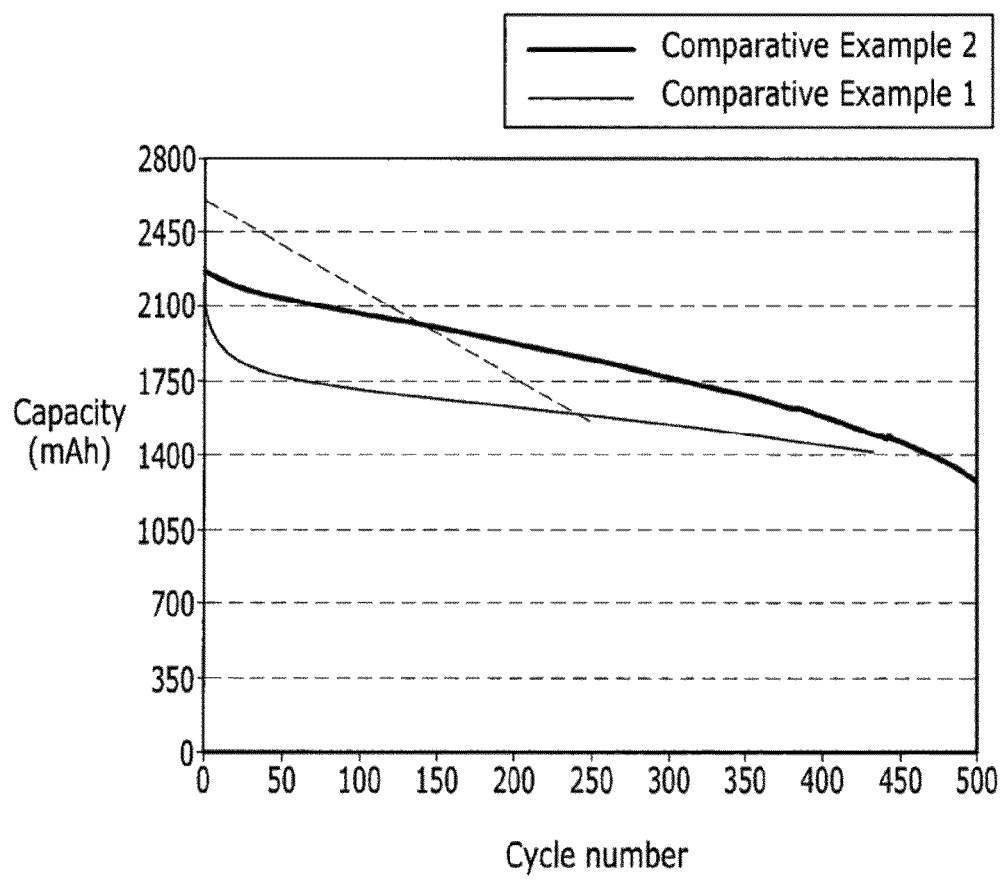
FIG. 8 is a graph showing cycle-life characteristics of the rechargeable lithium battery cells according to Comparative Examples 1 and 2.

FIG. 8 is a graph showing the cycle-life characteristics of the cells according to Comparative Examples 1 and 2.

Referring to FIGS. 7 and 8, the cell according to Example 1 showed improved cycle-life characteristics at a high current of 20 A, as compared to the cells according to Comparative Examples 1 and 2.

While certain exemplary embodiments have been described, those of ordinary skill in the art will understand that certain modifications and changes to the described embodiments may be made without departing from the spirit and scope of the disclosure, as described in the appended claims and equivalents thereof.

What is claimed is:

1. A rechargeable lithium battery comprising:
   a negative electrode comprising a negative active material comprising a graphite-silicon composite and graphite, the graphite-silicon composite comprising a graphite particle, a silicon (Si) particle on a surface of the graphite particle, and a carbon coating layer surrounding the silicon particle on the surface of the graphite particle;
   a positive electrode comprising a positive active material; and
   an electrolyte comprising a lithium salt, a non-aqueous organic solvent, and an additive comprising fluoroethylene carbonate in an amount of about 2 wt % to about 5 wt % based on the total amount of the non-aqueous organic solvent.

2. The rechargeable lithium battery of claim 1, wherein the graphite-silicon composite is present in an amount of about 5 wt % to about 15 wt % based on the total amount of the negative active material.

3. The rechargeable lithium battery of claim 1, wherein the silicon particle is present in an amount of about 1.0 wt % to about 7.5 wt % based on the total amount of the negative active material.

4. The rechargeable lithium battery of claim 1, wherein the silicon particle is present in an amount of about 15 wt % to about 25 wt % based on the total amount of the graphite-silicon composite.

5. The rechargeable lithium battery of claim 1, wherein the graphite particle is present in an amount of about 55 wt % to about 65 wt % based on the total amount of the graphite-silicon composite.

6. The rechargeable lithium battery of claim 1, wherein the carbon coating layer is present in an amount of about 15 wt % to about 25 wt % based on the total amount of the graphite-silicon composite.

7. The rechargeable lithium battery of claim 1, wherein the silicon particle has an average particle diameter of about 50 nm to about 300 nm.

8. The rechargeable lithium battery of claim 1, wherein the carbon coating layer has a thickness of about 0.5 μm to about 1.0 μm.

9. The rechargeable lithium battery of claim 1, wherein the non-aqueous organic solvent comprises dimethyl carbonate (DMC).

10. The rechargeable lithium battery of claim 9, wherein the dimethyl carbonate is present in an amount of about 50 volume % to about 70 volume % based on the total amount of the non-aqueous organic solvent.

11. The rechargeable lithium battery of claim 1, wherein the non-aqueous organic solvent has a viscosity of about 0.3 cP to about 5.0 cP.

12. The rechargeable lithium battery of claim 1, wherein the rechargeable lithium battery is configured to operate at a rate of about 5 C to about 10 C.

\* \* \* \* \*